Nov. 9, 1926.

C. T. RAY 1,606,261

TILLAGE IMPLEMENT

Filed August 31, 1921    4 Sheets-Sheet 1

Nov. 9, 1926.

C. T. RAY 1,606,261

TILLAGE IMPLEMENT

Filed August 31, 1921    4 Sheets-Sheet 3

Inventor
C. T. Ray
By C. J. Stockman
Attorney

Nov. 9, 1926.
C. T. RAY
1,606,261
TILLAGE IMPLEMENT
Filed August 31, 1921    4 Sheets—Sheet 4
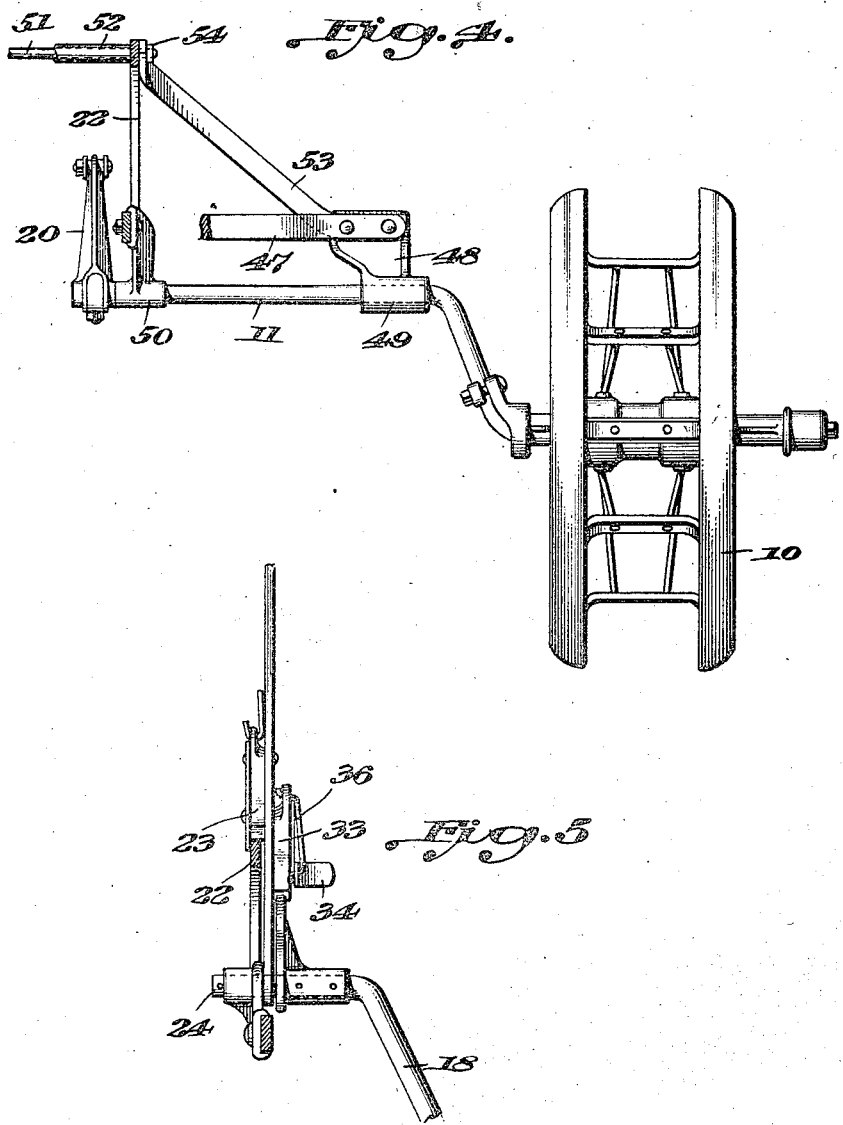

Patented Nov. 9, 1926.

1,606,261

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

TILLAGE IMPLEMENT.

Application filed August 31, 1921. Serial No. 497,223.

This invention has particular reference to tillage implements of the wheel plow class, including two-way sulky plows, listers and the like, whose frames are supported mainly by side wheels which in crossing the field alternately in opposite directions interchangeably and respectively serve as land and furrow wheels. In such implements the frame should remain level while the actual plowing operation is taking place.

Therefore, provision should be made for adjustments of the side wheels vertically relatively to the plane of the frame, the adjustments being such that the wheel which served as the land wheel when crossing the field in one direction may become the furrow wheel when crossing the field in the opposite direction and the wheel which in the first mentioned crossing was the furrow wheel may in the second mentioned crossing become the land wheel, the frame remaining at the same level in both crossings. In such implements provision should also be made for the raising of the soil working member to transport position and for lowering it to working position, and for adjusting it to produce a furrow of any one of several different depths, selectively. Finally, the mechanism should not only be such (1) that the adjustments of the wheels relatively to the plane of the frame may be such that the wheels interchangeably and alternately become land and furrow wheels, respectively, and (2) the adjustments of the soil working element from transport to working position and from working position to transport position, and selectively to produce furrows of different depths, may be made, but, moreover, the means for rendering such adjustment possible should be of simple nature, should be strong and durable, and should be such that the adjustments referred to may be made with a minimum of effort by the operator. It is one of the purposes of this invention to provide a mechanism having the several foregoing characteristics.

The invention, therefore, comprehends, broadly, as one of its important features the provision of a tillage implement comprising a main frame, wheels to support the land and furrow side thereof, a suitably mounted soil working element of appropriate character and means under control of the operator and operable to effect, selectively, vertical movement of either supporting wheel relatively to the plane of the frame and simultaneously therewith to effect corresponding movement of the soil working element. In a more particular sense the invention comprehends a correlation of parts such that the simultaneous movements of either supporting wheel and the soil working element are in opposite directions. And in a still more particular sense this part of the invention comprehends the provision of a tillage implement having a main frame and a ground working element movable relatively to the plane of the frame, with two independently adjustable supporting wheels for opposite sides of the frame, respectively, separately operative operator-controlled levers and connections between said levers and the supporting wheels, respectively, and between both levers and the ground working element whereby (1) one of the supporting wheels may be raised relatively to the plane of the frame by operation of the corresponding lever without affecting the respective positions of the other lever and wheel and similarly, the latter wheel may be lowered relatively to the plane of the frame by operation of its corresponding lever without affecting the respective positions of the first mentioned lever and wheel; (2) the ground working element is lowered simultaneously with the raising of the first mentioned wheel and is raised simultaneously with the lowering of the second mentioned wheel; (3) the operative connection between both wheels and the ground working element may be broken, at will, to permit independent adjustment of the soil working element or of either or both wheels, relative to the plane of the frame.

In a very particular way, the invention comprehends as the most desirable embodiment now known to me the provision of a tillage implement having a main frame and independently adjustable supporting wheels for opposite sides thereof, respectively, with a beam which carries a soil working element and has a swinging support mounted on the frame, independently movable operating levers, independent connections between said levers and the wheels, respectively, one connection operative by the corresponding lever to raise one wheel and the other operative by its corresponding lever to lower the other wheel, each relatively to the plane of the frame, and with separate latching means to hold the levers and hence the wheels releasably in adjusted position, and also with separately-releasable connections between the respective levers and the swinging support of the beam.

The invention further comprehends, as one of its severally new and useful features, the provision of a tillage implement having a main frame and supporting wheels and also having a beam whose rear end supports the ground working element and is connected with the frame by a pivotally mounted bail, or its equivalent, whose swinging movement in the adjustments of the ground working element imparts upward and forward movement or rearward and downward movement, as the case may be, to the rear end of the beam relatively to the frame, with a means which causes the front end of the beam to rise with the forward and upward movement of the rear end thereof and similarly to fall with the rearward and downward movement of said rear end. This, among other things, assures the same angular relation of the bottom of the ground working element to the ground in all adjustments of said element for depth of penetration into the soil. In a more particular sense the means which connects the front end of the beam and with the main frame of the implement has a member which is secured to the beam and is arranged at an inclination corresponding to the line of travel of the rear end of the beam during the adjustment of the ground working element for depth of penetration and traverses a fixed guide carried by the frame and in a still more particular sense the said inclined member has its upper end attached adjustably to the upper end of a brace or strut which is mounted forward of the guide on the main frame and has its lower end fixedly attached to the forward end of the beam, the adjustable connection of the inclined member with the strut providing an adjustment which changes the pitch of the plow body for hard or soft land or to compensate for wear of the point. This pitch, however, is maintained in all adjustments for depth of furrow.

Another of the severally new and important features of the invention has relation to the structure of the frame, this being such as to possess maximum strength with minimum weight.

All of the foregoing features are embodied in a most desirable form in the lister illustrated in the accompanying drawings, but it will be understood that this is merely exemplary and that the features of the invention may be otherwise and variously embodied within the substance of the appended claims.

In said drawings, wherein like characters of reference denote corresponding parts in the several views:—

Fig. 4 is a transverse sectional view on the plane indicated by the line 4—4 of Fig. 1.

Fig. 5 is a detail sectional view on the plane indicated by the line 5—5 of Fig. 2.

Figure 1:
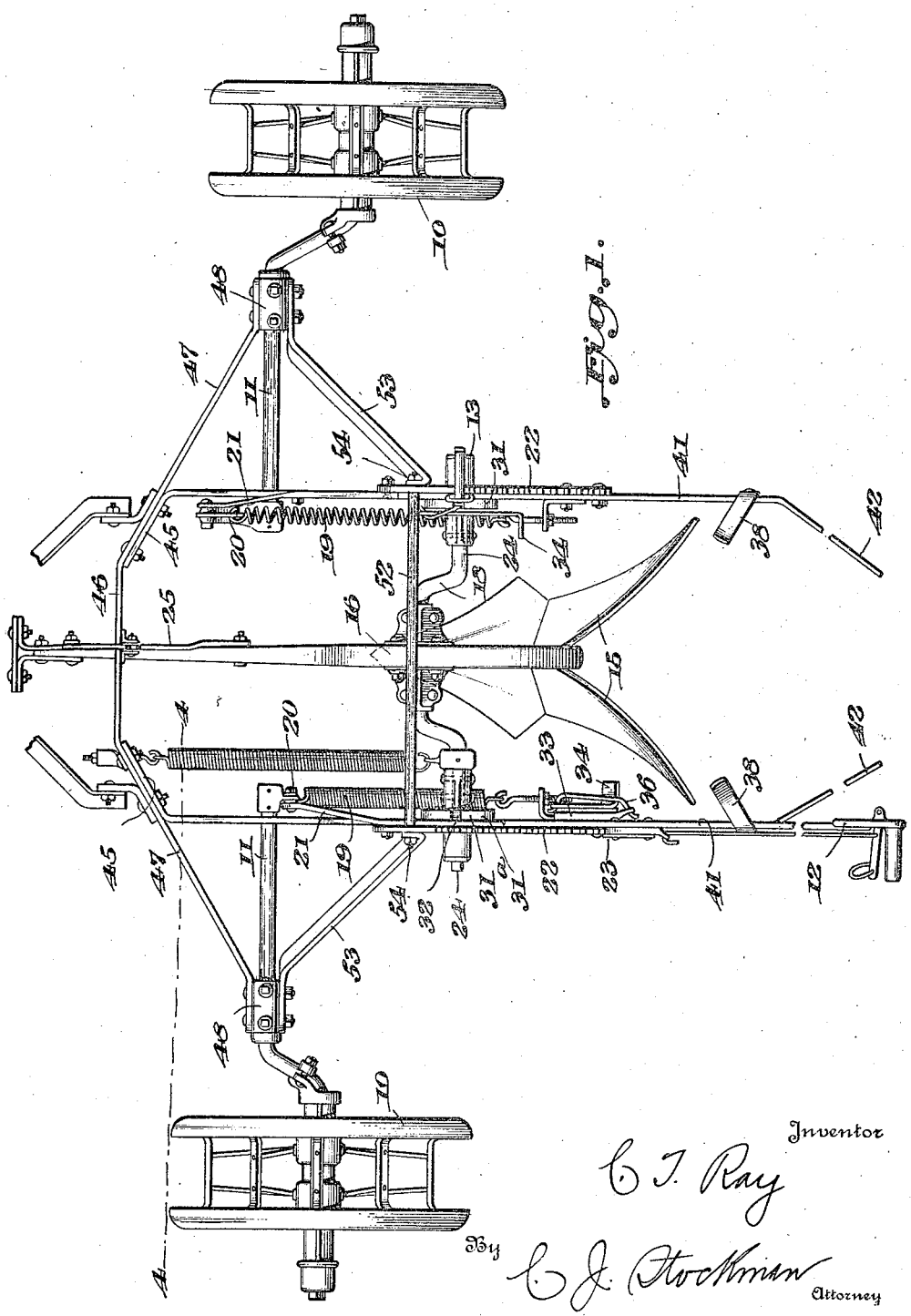
Figure 1 is a plan view of a preferred form of the invention.
Figure 2:
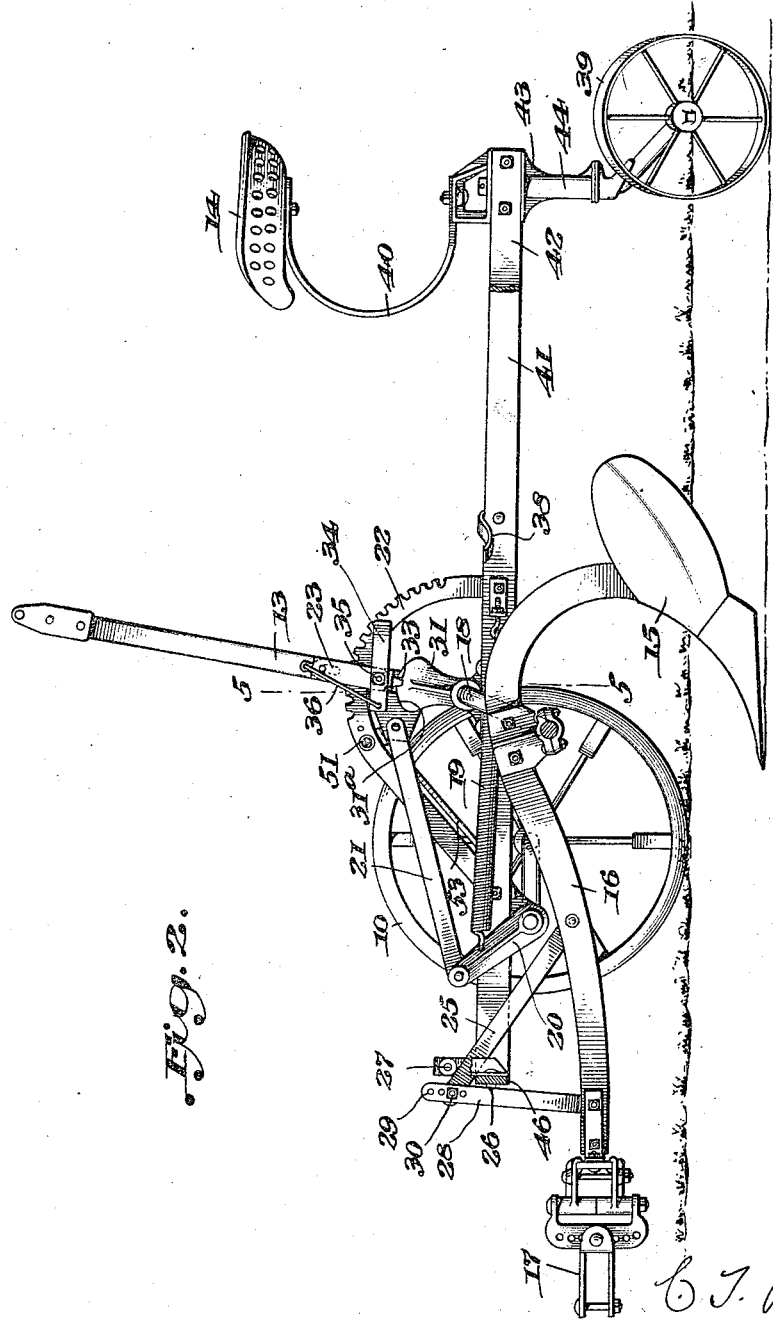
Figs. 2 and 3 are longitudinal sectional views showing the mechanism from opposite sides respectively.

As already seen, the implement contemplates a main frame (whose preferred construction is hereinafter set forth in detail); supporting wheels 10 for opposite sides of the frame, mounted to be independently adjustable relatively to the plane of the frame, whereby they may alternately and interchangeably become land and furrow wheels; a suitable ground working element, as a middlebreaker plow body 11, supported from the frame by means which permits it to be adjusted relatively to the plane thereof; suitable actuating elements, as hand levers 12 and 13, arranged within convenient reach from a driver's seat 14; and connections between each actuating element and the corresponding wheel 10 and between both actuating elements and the ground working element, said connections including disengageable elements; with all the parts referred to so correlated that (1) either wheel may be adjusted to become a furrow wheel without disturbing the position of the other, (2) the ground working element may be adjusted relatively to the plane of the frame simultaneously with the adjustment of either wheel and from the same actuating element which is operated to adjust either wheel, and (3) relative adjustment of either, or both, wheels and the ground working element is permitted. The various adjustments referred to contemplate all those which will be required in actual service, i. e., movement of the ground working element from ground working position to transport position and from transport position to ground working position, movement of each wheel to become a land wheel and a furrow wheel alternately, and the adjustments required in the setting of the ground working element selectively for different depths of furrows. The mechanism, furthermore, is such that the frame will remain level at all adjustments.

The supporting wheels 10 are carried by independent crank axles 11 journaled upon the frame, so that when either is moved in a clockwise direction, a lowering tendency will be exerted upon the corresponding wheel 10, thereby causing the corresponding side of the frame to rise if the wheels are on level ground, or causing the wheel to lower to run in a furrow which has been formed, without disturbing the level position of the frame. The ground working element 15, hereinafter called "plow body", is carried by a beam 16 which is supported, mainly, for vertical adjustment by a bail or looped hanger 18 which is movable selectively and interchangeably by the hand levers 12 or 13, or other appropriate actuating elements, common to the wheels and said plow body. The draft is applied to said beam, through the medium of appropriate appliances 17 at the front end of the beam.

The crank axles 11, preferably, are yieldingly impelled toward a normal or neutral position, as by springs 19 connected with arms 20 which also, through links 21, serve as the means by which the levers 12, 13 convey motion to the crank axles. Said levers traverse toothed segments 22 and carry yielding dogs 23 for engagement therewith to lock the levers and side wheels in adjusted positions.

Figure 3:
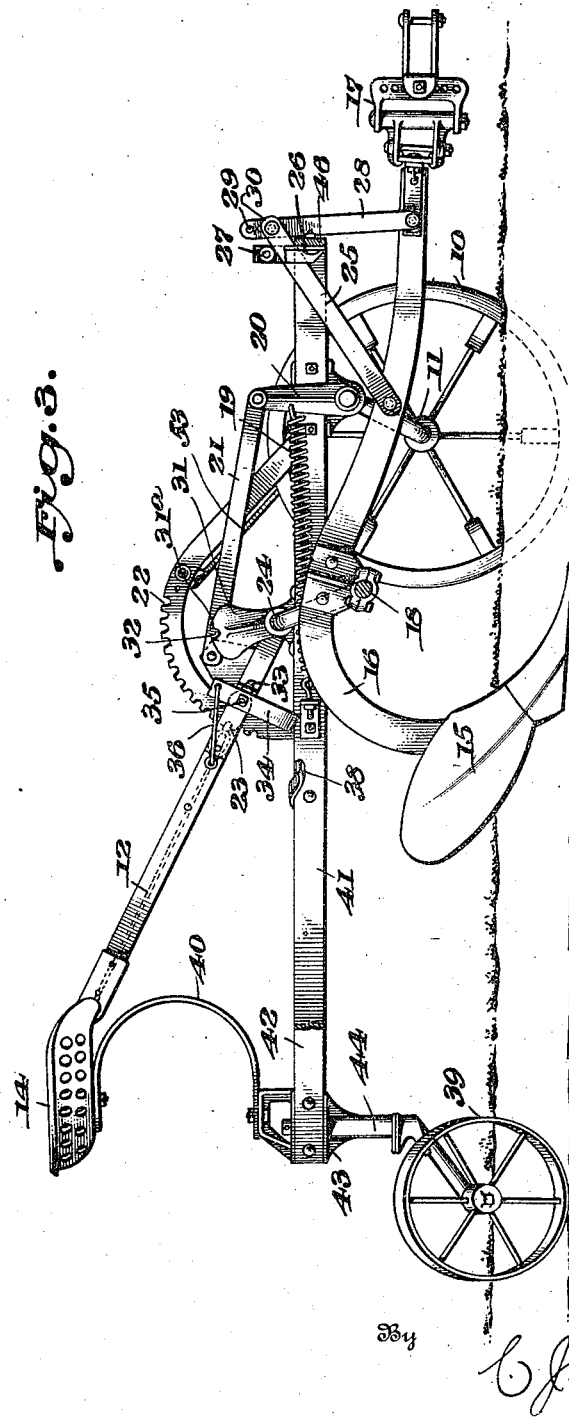

The main support of the plow body consisting of the bail or looped hanger 18 preferably constitutes a part of a crank shaft 24 mounted in suitable bearings on the frame, and serves to move the plow body in an arcuate path in effecting its elevation and depression or movement in a vertical plane. And in order to maintain the substantial horizontally, or uniformity of pitch of the plow body, the forward end of the beam is carried by a tangent bar 25, disposed in oblique relation with the beam in a vertical plane in the path of progress of the machine to traverse a guide or rest 26 on the frame. The tangent bar 25 is arranged parallel with a line drawn tangentially to the arc traversed by the plow body at a point about midway between the extremes of such arc, or about midway between the limits of movement upward and downward thereof. The tangent bar 25 in operation is fixed or stationary in relation to the beam and slides in the guide which may have an antifriction retaining means such as the roll 27, but to vary the pitch of the plow body the said bar is adjustable in its angular relation to the beam by means of the brace 28 having a series of openings 29 with which the bolt 30 may be selectively engaged. It is designed to provide for a selective movement of the hanger which controls the position of the plow body by either of the hand levers which, however, as above indicated, in the illustrated embodiment of the invention are permanently connected respectively with the crank axles which control the positions of the side wheels, and to this end the crank shaft 24 carries radial arms 31 arranged respectively adjacent to the planes of swinging movement of the hand levers and provided with seats or notches 32 for engagement by latch bolts 33 mounted upon the hand levers and controlled by trip levers 34 which are illustrated as treadles carried by the hand levers and pivoted thereto, as at 35, said treadles being within convenient reach of the feet of the operator occupying the seat 14 and being connected with the latch bolts by links 36. These latch bolts may be yieldingly held in position for engagement with the seats or notches 32 by suitable springs not shown, and the arms 31 are preferably provided with segmental guiding faces 31a which act as cams to direct the extremities of the latch bolts into engagement with the seats as the hand levers are swung into position for such engagement. Stationary foot rests 38 may also be provided for the convenience of the driver, and it will be noted that when the hand levers are in their rearwardly directed position, as shown, for example in Fig. 3, the treadle 34 is located adjacent to the stationary foot rest at that side of the machine.

At its rear end the frame is preferably supported by a caster wheel 39 which serves to follow in the furrow produced by the plow, while the seat standard 40 rises from the frame directly above the caster wheel.

The frame in the type of machine used as an illustration of the invention consists of side bars 41 which are arranged in convergent relation at their rear ends, as shown at 42, for connection with a block 43 constituting the support for the sleeve bearing 44 of the caster wheel, and at their front ends the side bars are arranged in forwardly convergent relation to constitute terminals 45 bolted or otherwise securely fastened to a front cross bar 46 which is extended on rearwardly divergent lines corresponding with the inwardly directed terminals 45 of the side bars to form braces 47 for attachment to the hangers 48 which support the bearing boxes 49 in which the crank axles are mounted at points adjacent to the angularly directed portions thereof. At their inner ends the crank axles are mounted in bearings 50 attached directly to the side bars of the frame.

The segments 22 which serve as the means whereby the hand levers may be held in their adjusted positions are connected transversely of the machine by a brace rod 51 fitted with a spacing sleeve 52 which bears terminally against the inner surfaces of the segments, and extending rearwardly and upwardly from the bearing box hangers 48 of the crank axles are braces 53 disposed on oblique lines both with reference to vertical and horizontal planes for connection at their rear ends with the segments by means of the terminals of the brace rod 51 which extend through said braces 53 and are engaged by nuts 54 or the equivalents thereof.

Thus, while the brace arms 47 serve as tensile means for resisting rearward strain upon the outer bearings for the crank axles the braces 53 serve to brace said bearings both vertically and horizontally and serve to communicate strain therefrom to the segments, which in turn are braced by the transverse rod 51 and its embracing sleeve 52, to the end that a compact and strongly resistant structure is afforded through the agency of relatively light members disposed essentially on the lines of strain and peculiarly adapted for cooperative action in maintaining a proper relative arrangement of the elements of the structure.

In operation, as will be obvious from the foregoing description, either supporting wheel may be moved to vary its elevation or vertical position with relation to the plane of the frame by the operation of its related hand lever, and at the same time the plow body bail or hanger may be moved by either hand lever to vary the position vertically with relation to the plane of the frame of the plow body, the movement of the plow body being in the opposite direction to that of the wheel moved by the common lever. That is when a hand lever is coupled to the corresponding crank shaft and is moved to depress the wheel which is connected therewith, such movement serves to elevate the plow body, whereas a movement of the lever to elevate the connected wheel serves to depress the plow body, substantially to a corresponding extent. When the desired adjustment relatively of the wheel and the plow body have been effected the locking of the lever by the engagement of its dog with the segment secures the wheel and plow body in the selected positions, subject however to variation in the position of the plow body with relation to the said wheel by the use of the other hand lever, providing of course the first named hand lever is disengaged from the crank shaft and the second named lever is engaged therewith. Therefore, it is possible to effect the adjustment of either side wheel in the desired direction independently of the other wheel and independently of the plow body or to effect an adjustment of either side wheel simultaneously with and in the opposite direction from the plow body to the end that the positions of one side wheel and the plow body may be reversed with relation to the frame and also with relation to the opposite side wheel by a single movement of the proper lever at the ends of the rows when, as herein above indicated, the wheels at opposite sides of the frame alternately travel on the land and in a previously formed furrow as the direction of movement of the machine is changed.

I claim:

1. A tillage implement having a frame, movable supporting wheels, a movable plow body and manually operable means for selectively effecting vertical movement of either of the wheels simultaneously with the plow body and relatively to the frame.

2. A tillage implement having a frame, movable supporting wheels, a movable plow body and manually operable means for selectively effecting vertical movement of either of the wheels and the plow body simultaneously in opposite directions relatively to the frame.

3. In a tillage implement, the combination of a frame, independently adjustable ground engaging wheels to support opposite sides of the frame, respectively, a plow body supported from the frame and adjustable relatively thereto, and connections to said wheels and to said plow body, operative to adjust either wheel independently of the other and to adjust the plow body simultaneously with the adjustment of either wheel.

4. In a tillage implement, the combination of a frame, ground engaging wheels to support opposite sides of the frame, respectively, said wheels being mounted for independent adjustment relatively to the frame, a plow body supported from the frame and adjustable relatively thereto, and means operative to adjust either wheel independently of the other and to adjust the plow body simultaneously with the adjustment of either of said wheels; comprising independently operative hand levers, connections between the hand levers and the wheels, respectively, and a disengagable connection between each hand lever and the plow body.

5. In a tillage implement, the combination of a frame, ground engaging wheels to support opposite sides of the frame, respectively, and adjustable relatively hereto, a plow body supported from the frame and adjustable relatively thereto and a plurality of operating means comprising a plurality of independently operative actuating elements, adjusting connections between each actuating element and the plow body and adjusting connections between the actuating elements and the wheels, respectively, the connections including disconnectible elements to permit separate adjustment, relatively, of the plow body and either or both wheels.

6. In a tillage implement, the combination of a frame, ground engaging wheels to support opposite sides of the frame, respectively, a plow body supported from the frame, said wheels and said plow body each mounted to be adjustable relatively to the frame, and operating means having independent actuating elements provided with adjusting connections to the wheels, respectively, and means to connect the actuating elements selectively with the plow body.

7. In a tillage implement, the combination of a frame, ground engaging wheels to support opposite sides of the frame, respectively, and independently adjustable relatively thereto, a plow body supported from the frame, and adjustable relatively thereto, and separate operating means having actuating elements connected with the plow body and with the respective wheels for effecting simultaneous movement of the corresponding wheel and of the plow body relatively to the plane of the frame.

8. In a tillage implement, the combination of a frame, ground engaging wheels to support opposite sides of the frame, respectively, and independently adjustable relatively thereto, a plow body supported from the frame, and adjustable relatively thereto, and separate operating means having actuating elements connected with the plow body and with the respective wheels for effecting simultaneous movement of the corresponding wheel and of the plow body in opposite directions relatively to the plane of the frame.

9. A tillage implement comprising a frame, movable wheels, a movable ground working member, independent means for adjusting the wheels, and a disengageable connection between the ground engaging member and each wheel adjusting means.

10. In combination, a frame, supporting wheels movable vertically with relation to said frame, independent means for controlling the position of each wheel, an element vertically movable with relation to the frame and carrying a ground engaging member and means for releasably connecting said element with either wheel controlling means.

11. In a tillage implement, the combination of a frame, a plow body, a plurality of independently adjustable supporting wheels for opposite sides of the frame, respectively, and selectively operative means for adjusting the corresponding supporting wheel, relatively to the frame, without effecting the relative position of the other supporting wheel and frame and for adjusting the plow body simultaneously with the adjusted wheel and oppositely thereto, the means for adjusting the plow body and wheels including elements whereby the plow body is adjusted when either of the wheels is adjusted.

12. A tillage implement having wheel carrying crank axles, a plow carrying crank shaft, and means for independently connecting either crank axle with the crank shaft for simultaneous adjustment.

13. A tillage implement having wheel carrying crank axles, a plow carrying crank shaft, the cranks being arranged in a pendent relation respectively to the axles and shaft and means for independently connecting either crank axle with the crank shaft for simultaneous adjustment of the crank shaft and the connected crank axle.

14. A tillage implement having wheel carrying crank axles, a plow carrying crank shaft, the cranks being arranged in a pendent relation respectively to the axles and shaft and disposed to swing toward each other in movement from a vertical toward a horizontal position, and means for independently connecting either crank axle with the crank shaft for simultaneous adjustment.

15. A tillage implement having a plow body suspended for forward and rearward swinging movement to effect elevation and depression thereof and provided with a draft beam, and a tangent bar carried by the beam for traversing a fixed guide, said bar being parallel with a tangent to the arc of movement of the plow body at a point between the extremities of said movement and being adjustable augularly to vary its relation of tangency to the path of movement.

16. In a tillage implement, a frame, a ground working member, a support for the ground working member, a swinging connection between the rear portion of the support and the frame, and means to connect the forward end of the support to the frame, comprising a member rising from said end of the support, an inclined arm whose rear end is connected to the support at a point between said swinging connection and member and whose forward end is connected to the upper end of said member, and a fixed guide traversed by the inclined arm and guiding the same to traverse an inclined path parallel with a tangent to the arc of movement of the ground working member.

17. In a tillage implement, a frame, a beam, a plow body carried by the beam, a swinging connection between the rear portion of the beam and the frame, and means to support the forward end of the beam, comprising a member rising from the forward end of the beam, an inclined arm whose rear end is connected to the beam at a point between said swinging connection and member and whose forward end is adjustably connected to the upper end of said member, and a fixed guide traversed by the inclined arm and guiding the same to traverse an inclined path parallel with a tangent to the arc of movement of the plow body.

18. In a tillage implement of the wide tread type, a main frame comprising side bars having converging forward ends and a front member having divergent end portions, secured to said forward ends of the side bars and extending outwardly and rearwardly therefrom; crank axles; inner and outer bearings for said axles, the outer bearings connected to the outer ends of the divergent portions of the front frame member; brace members disposed on lines which are oblique to both vertical and horizontal planes and have their forward ends connected to the outer axle bearings, respectively; and means rigidly secured to the sides of the frame and to which the rear ends of the last mentioned braces respectively are secured.

19. A tillage implement of the wide tread type having a wheel supported main frame provided with crank axles and outrigger side frames for sustaining the outer axle bearings, wherein each of said side frames consists of outwardly convergent front and rear elements of which the latter is disposed in an upwardly and rearwardly inclined supporting relation to the bearing in oblique relation to the plane of the main frame.

20. A tillage implement having a wheel supported frame with laterally extending crank axles, hand levers for actuating the crank axles and having locking means including rigidly sustained segments rising at opposite sides of the frame, and outwardly convergent side braces for sustaining outer bearings for the crank axles, the front braces being in the plane of the frame and the rear braces being disposed in an upwardly and rearwardly inclined position with its rear end connected with the corresponding segment.

21. A tillage implement having a wheel supported frame with laterally extended crank axles and axle operating hand levers having locking means including upstanding segments connected by a transverse brace bar, the outer bearings for the crank axles being carried by side frames having rearwardly, upwardly and inwardly inclined braces attached to said segments.

22. A tillage implement having a wheel supported frame with laterally extended crank axles and axle operating hand levers having locking means including upstanding segments connected by a transverse brace bar, the outer bearings for the crank axles being carried by side frames each of which embodies front and rear outwardly convergent braces, and means for securing contiguous portions of said transverse brace bar and rear brace to each other and to the corresponding segment.

23. A tillage implement having a wheel supported frame and means including hand levers for varying the plane of the frame with relation to respective supporting wheels thereof, a crank carried plow body, and means for coupling the respective hand levers releasably to the crank which carries the plow body.

24. A tillage implement having a wheel supported frame and means including hand levers for varying the plane of the frame with relation to respective supporting wheels thereof, a crank carried plow body, and means for releasably coupling the respective hand levers to the crank which carries the plow body and including seat carrying arms on the crank and engaging latch bolts on the levers.

25. A tillage implement having a wheel supported frame and means including a hand lever for varying the plane of the frame with relation to a supporting wheel thereof, a crank carried plow body, and means for coupling the hand lever to the crank which carries the plow body and including a seat carrying arm on the crank and an engaging latch bolt on the lever, the arm having a cam faced guide leading to the seat.

26. A tillage implement having a wheel supported frame and means including a hand lever for varying the plane of the frame with relation to a supporting wheel thereof, a crank carried plow body, and means for coupling the hand lever to the crank which carries the plow body and including a seat carrying arc on the crank and a treadle actuated latch bolt on the hand lever.

27. A tillage implement comprising, in combination, a supporting frame, supporting wheels for opposite sides of the frame, independently movable crank axles by which said wheels are carried, respectively, actuating levers, connections between said levers and cranks, respectively, means to hold the levers in selected positions, a plow body, a shaft having cranks to support the plow body from the frame, and means to lock the actuating levers severally and releasably to said shaft.

28. A tillage implement having a wheel supported frame and means including hand levers for varying the plane of the frame with relation to respective supporting wheels thereof, a crank carried plow body, means for coupling the respective hand levers releasably to the crank which carries the plow body, and means for locking either hand lever and the crank in adjusted position.

In testimony whereof I affix my signature.

CHARLES T. RAY.